United States Patent [19]
Bischoff et al.

[11] Patent Number: 6,032,856
[45] Date of Patent: Mar. 7, 2000

[54] STORAGE PHOSPHOR READER USING BAR CODE FOR CASSETTE EXTRACTION AND ALIGNMENT

[75] Inventors: David Bischoff, Fairport; Michael K. Rogers, Mendon, both of N.Y.

[73] Assignee: Eastman Kodak Company, Rochester, N.Y.

[21] Appl. No.: 08/936,069

[22] Filed: Sep. 23, 1997

[51] Int. Cl.[7] .......................... G06F 17/00; G03B 42/04; H05B 33/00
[52] U.S. Cl. ...................... 235/375; 378/182; 250/484.4
[58] Field of Search ................................ 235/375, 462.01, 235/385; 378/181–188; 250/484.4, 589, 581

[56] References Cited

U.S. PATENT DOCUMENTS 5,277,322  1/1994  Boutet et al. .
5,330,309  7/1994  Brahm et al. .
5,376,806  12/1994  Hejazi ...................................... 250/584

*Primary Examiner*—Thien M. Le
*Assistant Examiner*—Daniel H. Sherr
*Attorney, Agent, or Firm*—William F. Noval

[57] ABSTRACT

A storage phosphor reader comprising: a receiving station for receiving a cassette containing a removable storage phosphor; a movable extraction mechanism for extracting and replacing a storage phosphor contained in a received cassette; a bar code located on the cassette/storage phosphor, the bar code including dimension data of a storage phosphor contained in the cassette; a bar code reader located at the receiving station for reading the bar code dimension data on a received storage phosphor cassette; and control means for controlling the movement of the extraction mechanism relative to a received storage phosphor cassette as a function of the read dimension data.

5 Claims, 7 Drawing Sheets

6,032,856

STORAGE PHOSPHOR READER USING BAR CODE FOR CASSETTE EXTRACTION AND ALIGNMENT

FIELD OF THE INVENTION

This invention relates in general to storage phosphor readers and more particularly to a bar code system for use in a storage phosphor reader to properly locate a storage phosphor extraction mechanism relative to a cassette to facilitate extraction of a storage phosphor from the cassette.

BACKGROUND OF THE INVENTION

In a known storage phosphor reader, a cassette containing a storage phosphor is located at a cassette receiving station where the cassette is clamped to the reader. A storage phosphor extraction mechanism extracts the storage phosphor from the cassette and moves the storage phosphor onto a stage. The stage moves the storage phosphor past a laser scanning reading station where the latent radiographic image stored in the phosphor is converted to a radiographic image signal.

In order to successfully extract the storage phosphor, the reader must know where the cassette is located to properly position the extraction mechanism. Since there exist a number of different sized cassettes, it becomes critical to adjust for location of the extraction mechanism. Cassettes smaller than 35 cm×43 cm require a holding pallet to be successfully fed into the reader. This causes a dimensional difference in cassette location from a datum point.

An extraction mechanism used in such reader includes a hook bar assembly and a locating pin (See: U.S. Pat. No. 5,330,309, issued Jul. 19, 1994, inventors Brahm et al). The assembly is initially moved so that the locating pin contacts the front end of the storage phosphor. The assembly is then moved laterally of the cassette until the locating pin falls into a reference opening in the front end of the storage phosphor. The extractor assembly is then moved relative to the cassette to engage the hook bar assembly with the storage phosphor to unlatch the storage phosphor and to subsequently remove the storage phosphor from the cassette onto a stage. Although this extraction mechanism has been suitable for its intended purpose, it would be desirable to provide a simpler, more reliable, more efficient, and less costly extraction system.

SUMMARY OF THE INVENTION

According to the present invention there is provided an improvement over the apparatus described above. According to a feature of the present invention there is provided: a storage phosphor reader comprising; a receiving station for receiving a cassette containing a removable storage phosphor; a movable extraction mechanism for extracting and replacing a storage phosphor contained in a received cassette; a bar code located on the cassette/storage phosphor, the bar code including dimension data of a storage phosphor contained in the cassette; a bar code reader located at the receiving station for reading the bar code dimension data on a received storage phosphor cassette; and control means for controlling the movement of the extraction mechanism relative to a received storage phosphor cassette as a function of the read dimension data

ADVANTAGEOUS EFFECT OF THE INVENTION

The present invention is simple, reliable, and efficient.

DETAILED DESCRIPTION OF THE INVENTION

Figure 1:
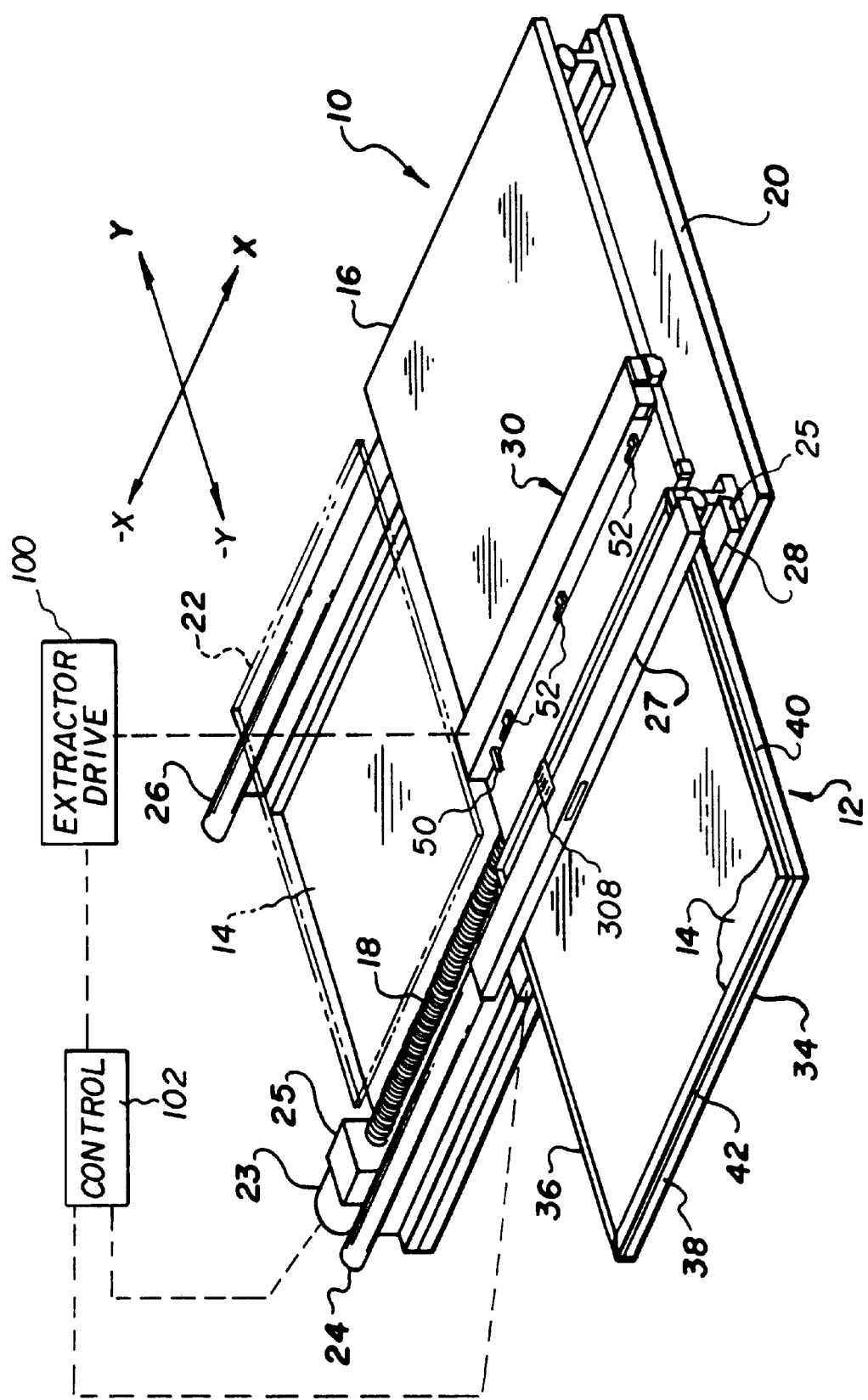
FIG. 1 is a perspective view of components of a storage phosphor reader incorporating the present invention.
Figure 2:
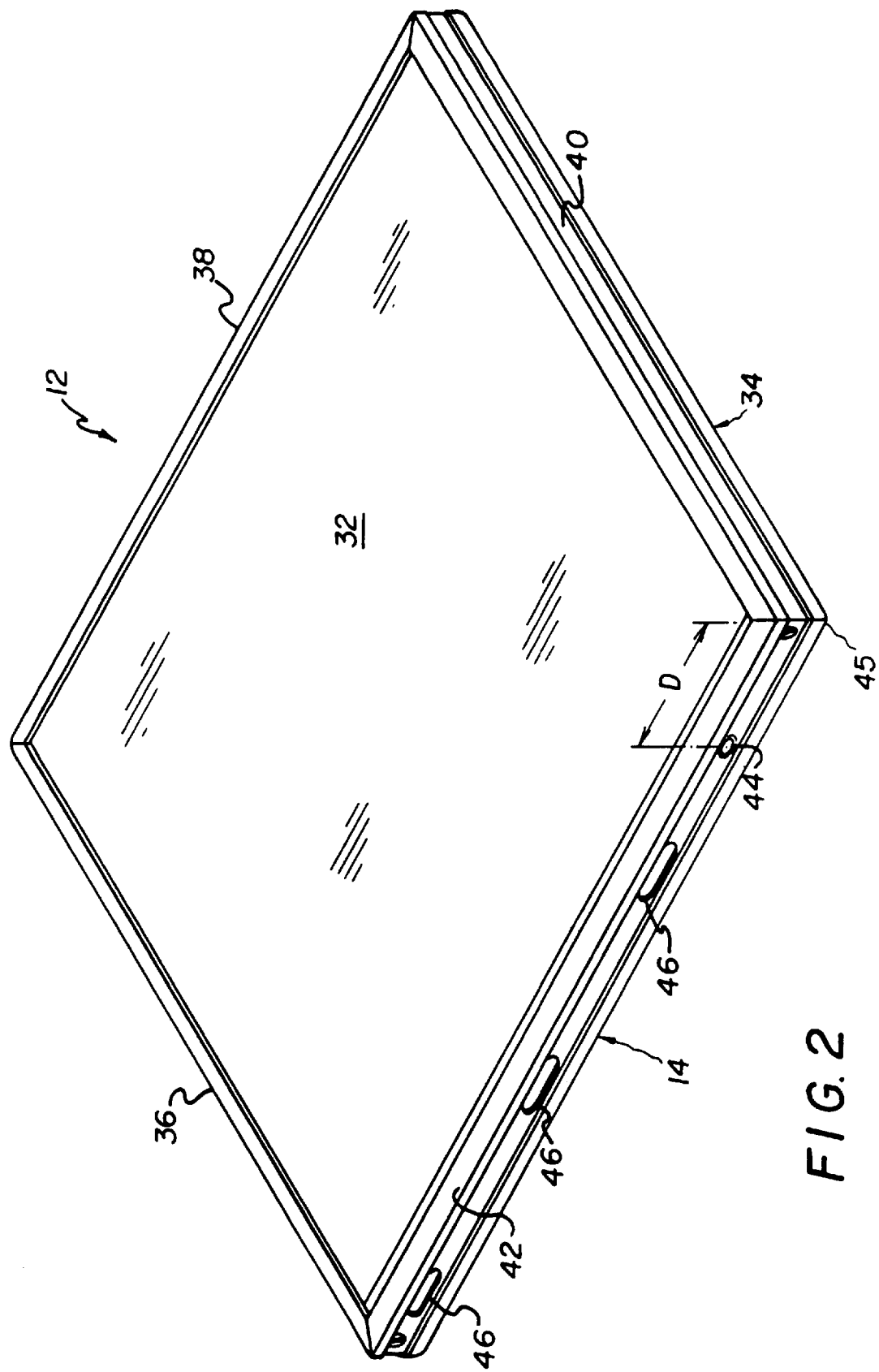
FIGS. 2 and 3 are perspective views of storage phosphor cassettes which can be read by reader 10.

Referring to FIGS. 1–2, there is illustrated a storage phosphor reader 10 including components for scanning a storage phosphor. In the particular embodiment illustrated, the reader 10 is designed to receive a cassette 12 having a storage phosphor 14 disposed therein. Storage phosphor 14 is capable of storing a latent image upon x-radiation of a body part. A digital image can be extracted for later viewing or development of a x-ray film by reading the latent x-ray image with a laser scanning reader. The reader is of the faster scanner-type. Briefly, when the image on the storage phosphor 14 is exposed to a stimulating ray beam, such as a laser beam, the storage phosphor 14 emits a light in proportion to a stored x-radiation energy. The light thus emitted is photoelectrically detected and converted to an electrical signal, and the radiation image of the object is reproduced visually by exposure of the image signal on a recording medium such as a photographic film or on a video monitor.

The stimulating of the storage phosphor by a laser beam is typically done using a raster scanning technique. The mechanism 10 includes a movable stage 16 which includes a drive screw 18 which is mounted to base 20 of the reader. The drive screw 18 is in threaded engagement with movable stage 16 so as to move the stage 16 from the receiving position illustrated in FIG. 1 to the scanned position 22 illustrated by dash lines also in FIG. 1. An appropriate stepper motor 23 and corresponding transmission 25 is provided for rotating the drive screw 18 such that the stage 16 can move in the X direction. The stage 16 is supported by a pair of guide rails 24,26 which are axially spaced apart and secured to the base 20. Guide rails 24,26 and drive screw 18 are in substantial parallel alignment with each other.

The reader includes a cassette clamping mechanism at cassette receiving station 25. The clamping mechanism includes an upper clamp jaw 27 and lower clamp jaw 28 which are used to clamp the cassette in a predetermined fixed position.

The mechanism 10 includes an extractor bar assembly 30 which is mounted to stage 16 for movement in the Y direction by extractor drive 100. The X and Y directions, as set forth in this application, have been provided merely for the sake of clarity in describing the direction of movement of various parts, it being understood that any coordinate system may be substituted as desired. In the particular embodiment, the extractor bar assembly 30 is designed for movement to and away from the cassette 12, while the stage 16 moves in a direction substantially transverse to the end/side of the cassette facing the extractor bar assembly 30. The cassette 12 is of the type designed for removing the storage phosphor from the end/side of the cassette. Briefly, as shown in FIG. 2, the cassette 12 comprises a shell having upper and lower panels 32,34, respectively, and three side caps 36,38,40. A storage phosphor 14 is disposed therein and is secured to a removable end cap 42. The end cap 42 includes a latching mechanism for releasing the end cap 42 from the cassette 12. Additionally, the end cap 42 includes an alignment opening 44, disposed preferably along one side of the cassette 12. The end cap 42 further includes a plurality of access openings 46 designed to receive hook members designed to engage the latching mechanism disposed within the cassette (not shown). The latching mechanism is of a construction such that when the hook mechanism is moved in a particular direction, it will release the end cap 42 from the cassette 12 allowing the end cap 42 and attached storage phosphor 14 to be removed therefrom.

Figure 3:
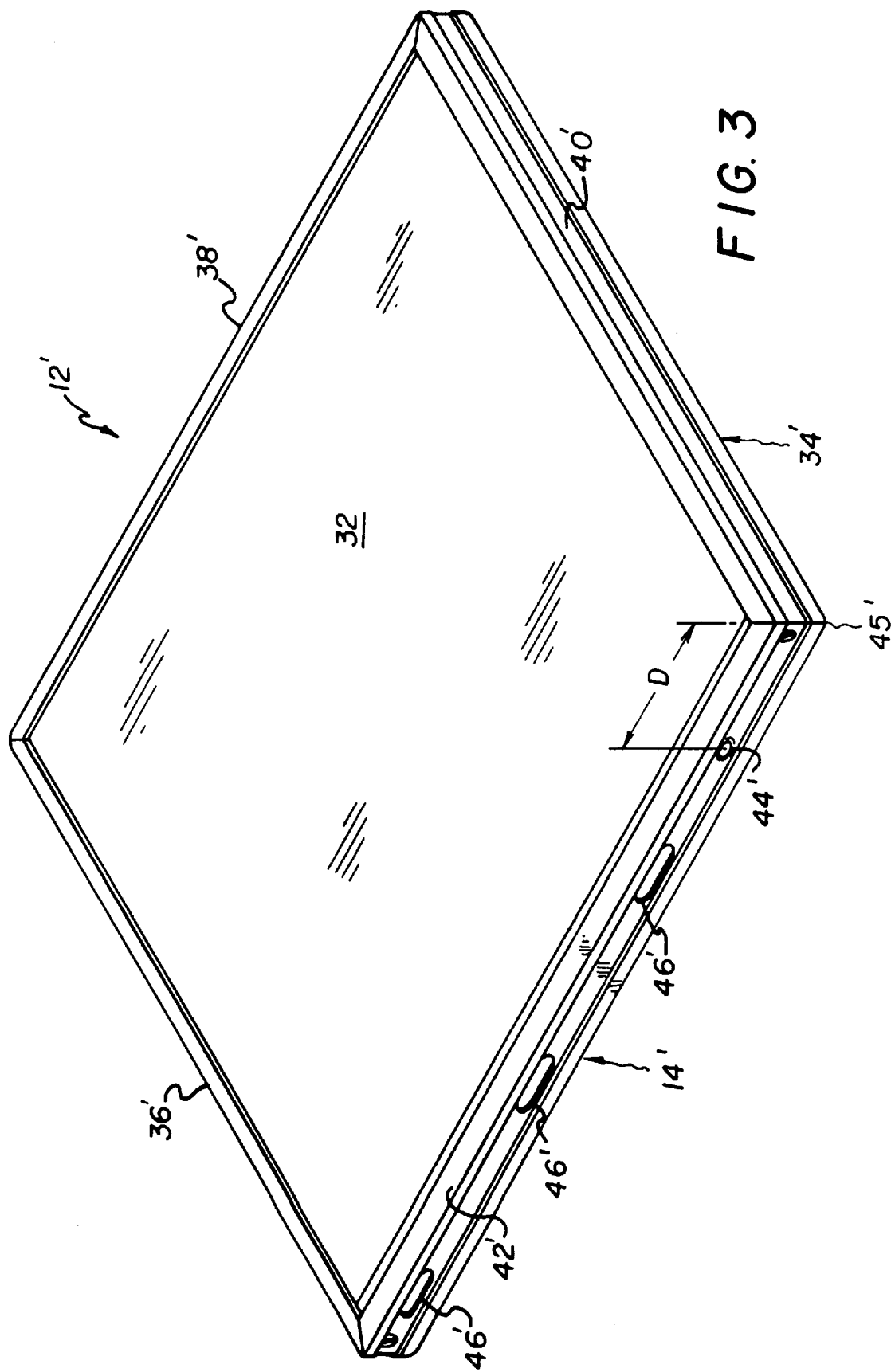

FIG. 3 shows a different sized cassette 12' having a shell with upper and lower panels 32',34', respectively, and three side caps 36',38',40'. Removable storage phosphor 14' is disposed therein and is secured to an end cap 42'. End cap 42' has alignment opening 44' and access openings 46'. Cassette 12' is preferably held in a pallet such as disclosed in U.S. Pat. No. 5,277,322 to facilitate handling of the cassette.

Cassette 12 contains a larger storage phosphor 14 than the storage phosphor 14' of cassette 12'. For example, storage phosphor 14 has the dimensions 35 cm×43 cm and storage phosphor 14' has the dimensions 20 cm×25 cm.

Figure 5:
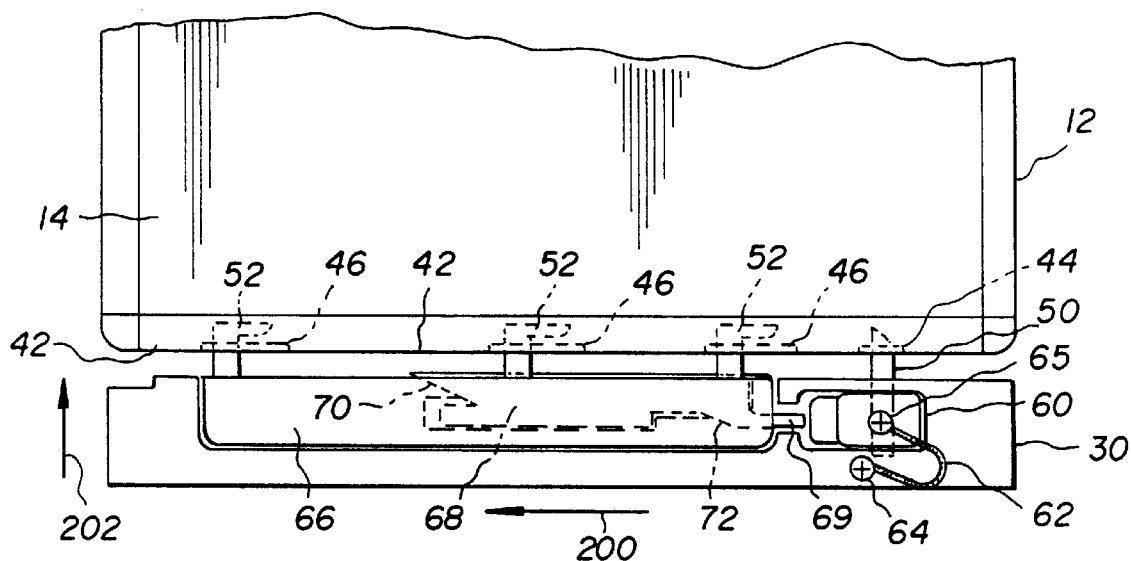
FIGS. 5 and 6 are diagrammatic plan views of a storage phosphor extraction mechanism.
Figure 6:
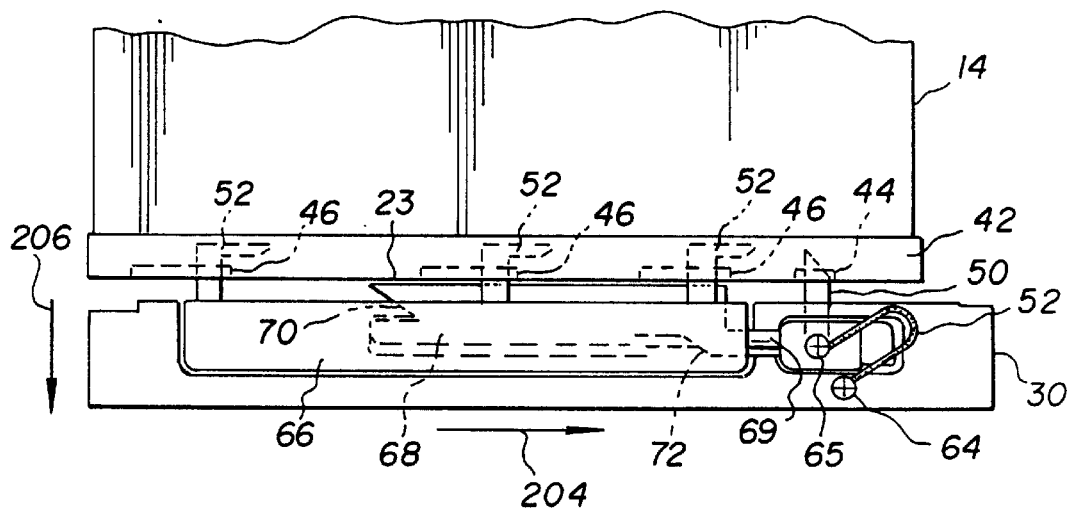

Referring now to FIGS. 5 and 6, there is shown in greater detail extractor bar assembly 30. As shown, extractor bar assembly 30 includes a locator pin 50 and hook members 52. Pin 50 is adapted to enter alignment opening 44 in storage phosphor 14 and hook members 52 are adapted to enter access openings 46 in storage phosphor 14. Pin 50 is fixedly mounted on slider 60. An over center spring 62 is connected by fastener 64 to assembly 30 and by fastener 65 to slider 60. Hook members 52 are mounted on hook plate 66. A wedge mechanism 68 includes a pin 69 which is engageable by slider 60.

Extractor bar assembly 30 mounted on stage 16 is driven in the direction of arrow 202 by extractor drive 100 (FIG. 1) on stage 16 and in the direction of arrow 200 by stage 16, motor 23 and transmission 25 to insert locator pin 50 into alignment opening 44 and hook members 52 into access openings 46. The direction of stage 16 is reversed to move assembly 30 in the direction of arrow 204 (FIG. 6). Slider 60 engages pin 69 which urges wedge mechanism 68 forward into contact with end cap 42 of storage phosphor 14 by means of camming surfaces 70,72. Over center spring 62 locks hook members 52 in engagement with storage phosphor 14. Extraction bar assembly 30 is then moved by drive 100 in the direction of arrow 206 to completely remove storage phosphor 14 from cassette 12.

This process is reversed to insert storage phosphor 14 back into cassette 12.

Wedge mechanism 68 holds end cap 42 rigid relative to storage phosphor 14 so that wear of pin 44, hooks 52, and end cap 42 is minimized during extraction and insertion of storage phosphor 14.

Figure 7:
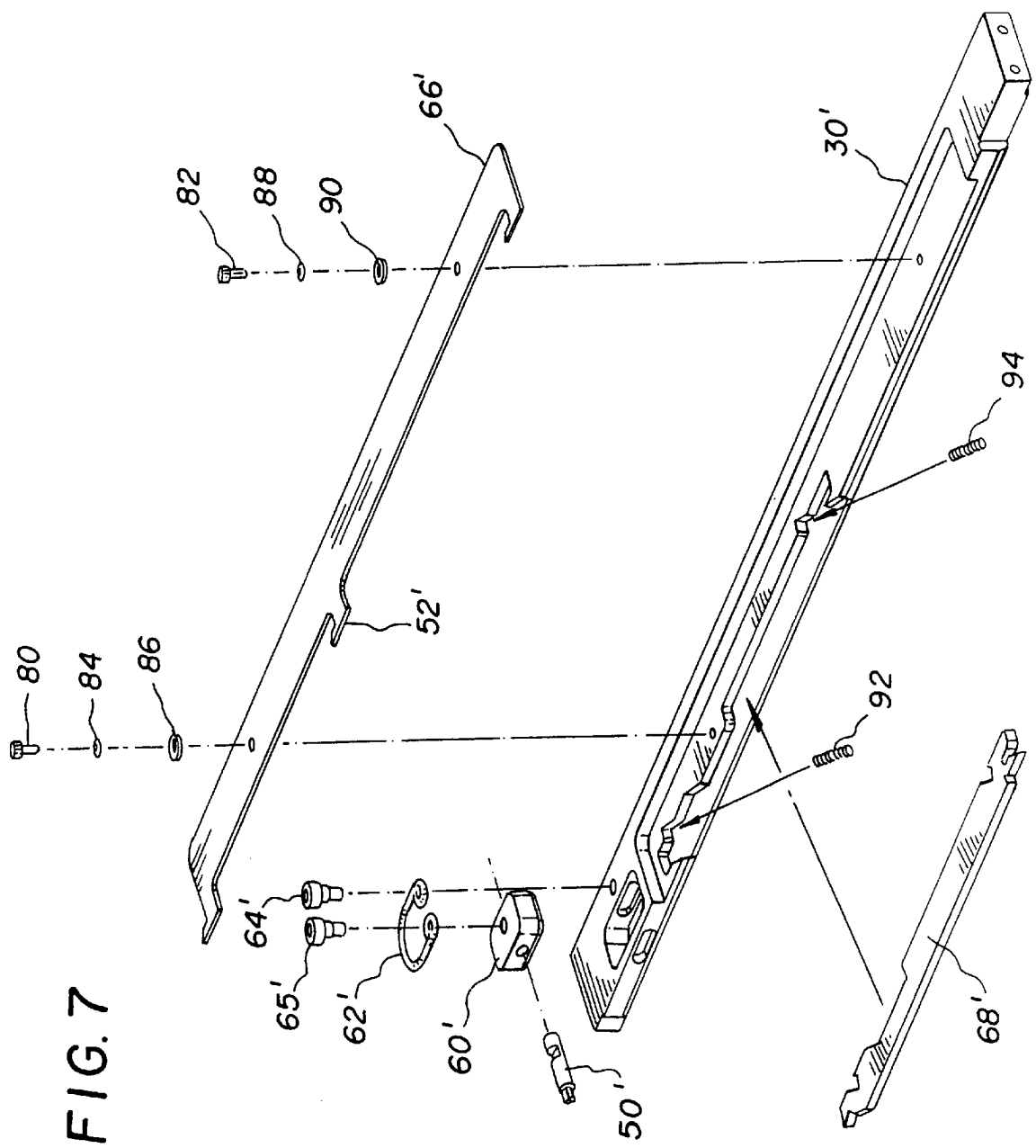
FIGS. 7 and 8 are respective exploded and plan views of another storage phosphor extraction mechanism.
Figure 8:
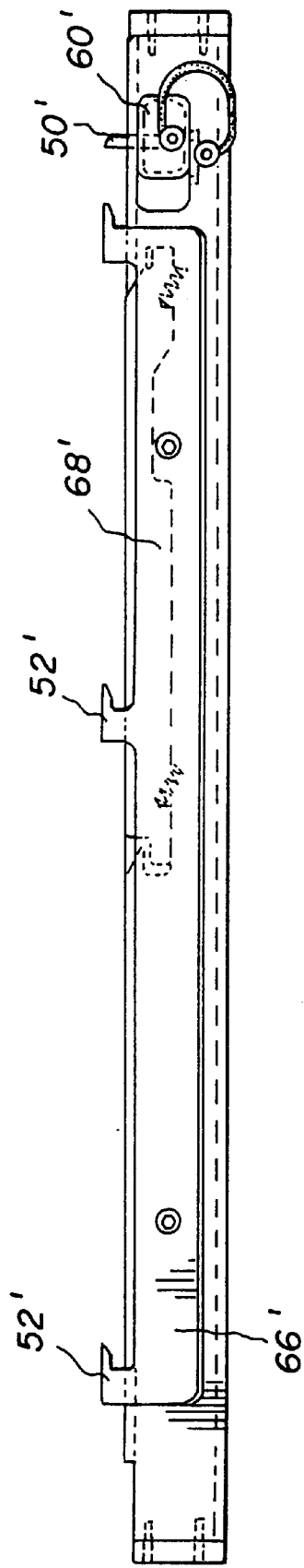

Referring now to FIGS. 7 and 8, there is shown another extractor bar assembly 30'. As shown, extractor bar assembly 30' includes a locator pin 50' and hook members 52'. Pin 50' is mounted on slider 60'. Over center spring 62' is connected by fastener 64' to assembly 30' and by fastener 65' to slider 60'. Hook members 52' are mounted on hook plate 66'. Hook plate 66' is mounted on assembly 30' by fasteners 80,82 with respective washers 84,86 and 88,90. A wedge mechanism 68' is slidably mounted between plate 66' and assembly 30'. Springs 92,92 normally bias wedge mechanism forwardly. Over center spring 62' operates in a manner similar to spring 60.

The extractor bar assembly 30' of FIGS. 7 and 8 differs from the extractor bar assembly 30 of FIGS. 5 and 6 in the mounting and operation of the respective wedge mechanism 68,68'. Wedge mechanism 68 is normally retracted and is extended only after locator pin 50 has entered alignment opening 44 in storage phosphor 14. When assembly 30 is moved to engage hook members 52 with end cap 42, slider 60 through pin 69, cams wedge mechanism 68 forward into contact with end cap 42. On the other hand, wedge mechanism 68' is normally urged forward to an extended position so that as pin 50' is moved into alignment opening 44, wedge mechanism 68' contacts end cap 42 and stays in contact with end cap 42 during the locking movement of hook members 52.

The distance D between alignment opening 44 in end cap 42 of storage phosphor 14 and reference corner 45 is greater than the distance D' between alignment opening 44' in end cap 42' of storage phosphor 14' and reference corner 45' (See: FIGS. 2 and 3). Thus, some technique must be used to align pin 50 of assembly 30 with opening 44 of storage phosphor 14 to avoid the disadvantages of the alignment mechanism of U.S. Pat. No. 5,330,309.

Figure 4:
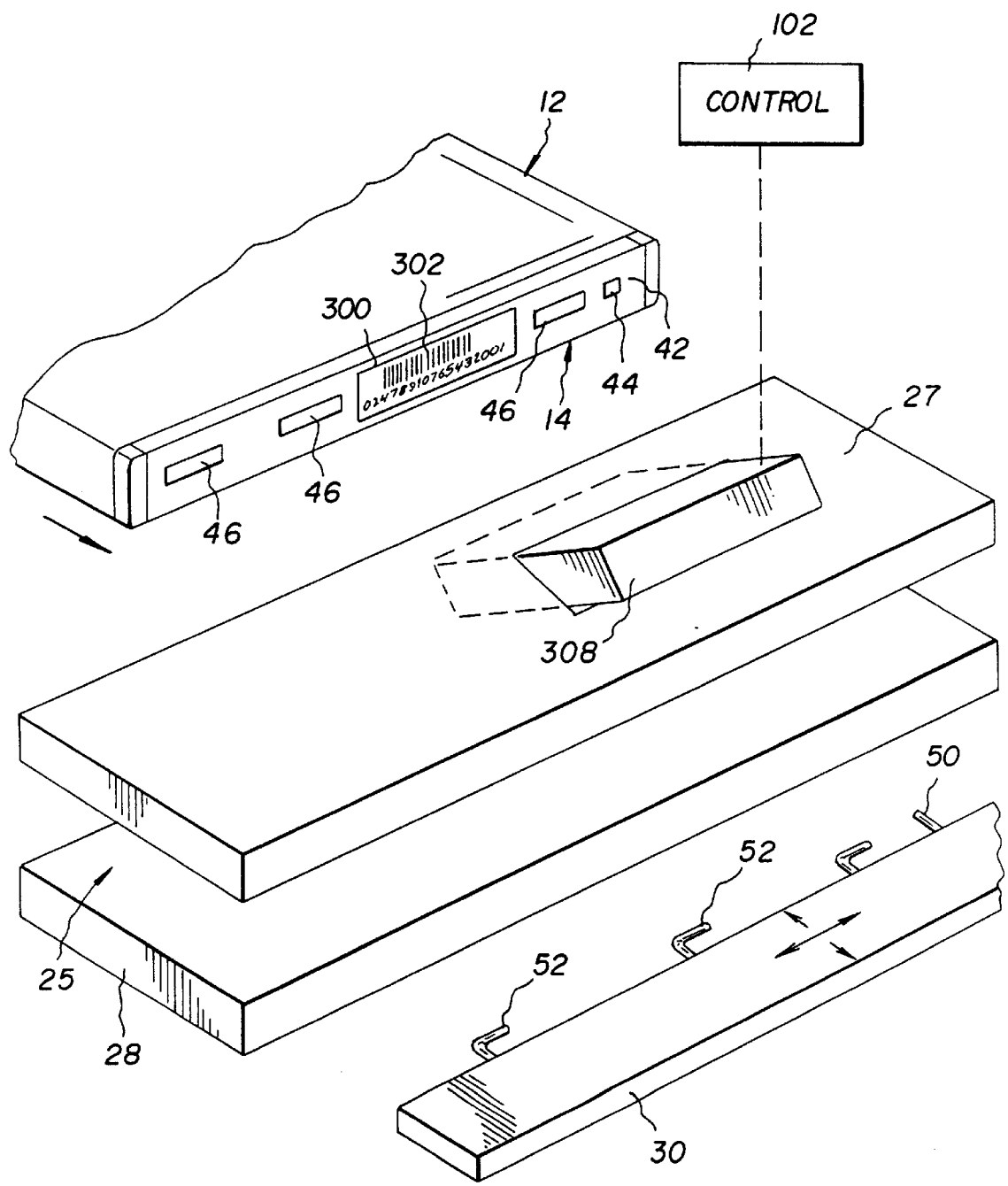
FIG. 4 is a diagrammatic view of an embodiment of the present invention.

As shown in FIG. 4, end cap 42 of storage phosphor 14 is provided with a bar code label 300. Label 300 includes a bar code 302 encoding various data including storage phosphor ID number, storage phosphor dimensional size (e.g., 35 cm×43 cm), and speed (of screen). Mounted on upper clamp jaw 27 is a bar code reader 308 of a known type. Before cassette 12 is clamped between clamp jaws 27,28 at cassette receiving station 25, bar code reader 308 reads the bar code 302 including storage phosphor dimensional size data. This data is transmitted to control 102 (such as a microprocessor system). Control 102 uses the storage phosphor dimensional data to control extractor drive 100 and stage drive motor 23 to position extraction bar assembly 30 so that pin 50 is exactly aligned with alignment opening 44 in end cap 42. This bar code alignment system eliminates the pin switch system of U.S. Pat. No. 5,330,309, thus increasing reliability, minimizing reader down time, and eliminating damage to the cassette caused by the locating pin striking the cassette.

Although the bar code reader 308 has been shown mounted on upper clamp jaw 27, it could also be located in lower jaw member 28, on extracting bar assembly 30, or any other propitious location.

The invention has been described in detail with particular reference to certain preferred embodiments thereof, but it will be understood that variations and modifications can be effected within the spirit and scope of the invention.

PARTS LIST 10 reader
12,12' cassettes
14,14' storage phosphors
16 movable stage
18 drive screw
19 drive nut
20 base
21 element
22 scanned position
23 stepper motor
24,26 guide rails 25 cassette receiving station
27 clamp jaw
30,30' extractor bar assembly
32,32' upper panels
34,34' lower panels
36,36',38,38',40,40' side caps
42,42' removable end caps
44,44' alignment openings
45,45' reference corners
46,46' access openings
50,50' locator pins
52,52' hook members
60,60' sliders
62,62' over center springs
64,64',65,65' fasteners
66,66' hook plates
68,68' wedge mechanisms
69 pin
70,72 camming surfaces
80,82 fasteners
84,86,88,90 washers
92,94 springs
100 extractor drive
102 control
300 bar code label
302 barcode
308 bar code reader

What is claimed is:

1. A storage phosphor reader comprising;
a receiving station for receiving a cassette containing a removable storage phosphor;
a movable extraction mechanism for extracting and replacing a storage phosphor contained in a received cassette;
a bar code located on said cassette/storage phosphor, said bar code including dimension data of a storage phosphor contained in said cassette;
a bar code reader located at said receiving station for reading said bar code dimension data on a received storage phosphor cassette before removing said storage phosphor from said cassette; and
control means for controlling the movement of said extraction mechanism relative to a received storage phosphor cassette as a function of said read dimension data.

2. The storage phosphor reader of claim 1 wherein said receiving station includes cassette clamping means for clamping a cassette at said receiving station and wherein said bar code reader is mounted in association with said clamping means to read said bar code located on said received cassette/storage phosphor.

3. The storage phosphor reader of claim 1 wherein said received cassette has an open end closed by an end cap of said storage phosphor and wherein said bar code is located on said end cap facing said extraction mechanism.

4. The storage phosphor reader of claim 3 wherein said receiving station has a clamp for clamping said cassette to said storage phosphor reader and wherein said bar code reader is mounted on said clamp in facing relationship to said bar code.

5. The storage phosphor reader of claim 3 wherein said end cap has a face with an alignment opening and wherein said extraction mechanism includes a locating pin facing said end cap, and wherein said control means controls the movement of said extraction mechanism so that said locating pin is inserted into said alignment opening without engagement of said pin with said end cap face.

* * * * *